(12) United States Patent
Höller et al.

(10) Patent No.: US 7,158,788 B2
(45) Date of Patent: Jan. 2, 2007

(54) METHOD AND APPARATUS FOR AUTO-CONFIGURATION FOR OPTIMUM MULTIMEDIA PERFORMANCE

(75) Inventors: Jan Höller, Stockholm (SE); Björn Landfeldt, Menai (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 515 days.

(21) Appl. No.: 10/273,821

(22) Filed: Oct. 17, 2002

(65) Prior Publication Data

US 2003/0119515 A1 Jun. 26, 2003

Related U.S. Application Data

(60) Provisional application No. 60/335,682, filed on Oct. 31, 2001.

(51) Int. Cl.
 *H04Q 7/20* (2006.01)
(52) U.S. Cl. ............... 455/445; 455/452.2; 455/432.1; 455/432.3
(58) Field of Classification Search ............. 455/452.2, 455/432.1, 432.3, 552, 426, 454, 445
 See application file for complete search history.

(56) References Cited

U.S. PATENT DOCUMENTS

| | | | |
|---|---|---|---|
| 6,546,246 B1 * | 4/2003 | Bridges et al. .......... 455/432.1 |
| 6,771,964 B1 * | 8/2004 | Einola et al. ............... 455/437 |
| 2001/0012279 A1 | 8/2001 | Haumont et al. ........... 370/331 |
| 2002/0119776 A1 * | 8/2002 | Vestergaard et al. ........ 455/436 |
| 2003/0013434 A1 * | 1/2003 | Rosenberg et al. ......... 455/414 |
| 2003/0119546 A1 * | 6/2003 | Hayduk ...................... 455/552 |

FOREIGN PATENT DOCUMENTS

| WO | WO 01/55832 A1 | 8/2001 |
|---|---|---|
| WO | WO 01/63860 A1 | 8/2001 |
| WO | PCT/SE 02/01965 | 1/2003 |

* cited by examiner

*Primary Examiner*—Joseph Feild
*Assistant Examiner*—S. Smith

(57) ABSTRACT

An auto-configuration arrangement enables a general-purpose mobile terminal or user equipment (UE) and an access network having specific native or standardized codecs and media formats to conform to one another and to thus optimize resource utilization in the access network. When the UE is attached to the access network, UE and user identifier information is signaled by the UE to a configuration node implemented in the access network. The configuration node acquires information details regarding the UE, and also relevant user subscription information, by retrieval from one or more access network registers. The configuration node then uses the detailed information together with access network specific information to decide what QoS definition and type of codec to select for use, and assembles the selected definitions and codecs, such as by retrieval from a repository. The configuration node sends the selected QoS definitions and codecs to the UE, and the UE configures itself in accordance therewith by means of a configuration layer residing in the UE.

27 Claims, 3 Drawing Sheets

METHOD AND APPARATUS FOR AUTO-CONFIGURATION FOR OPTIMUM MULTIMEDIA PERFORMANCE

CROSS REFERENCE TO RELATED APPLICATION

This application for patent claims the benefit of priority from, and hereby incorporates by reference the entire disclosure of, co-pending U.S. Provisional Application for Pat. No. 60/335,682, filed Oct. 31, 2001.

BACKGROUND OF THE INVENTION

The invention disclosed and claimed herein pertains to a method and apparatus for optimizing data transfer between a general-purpose terminal or user equipment (UE) and any one of several different access networks. More particularly, the invention pertains to method and apparatus of the above type wherein the UE and respective access networks are to be used in connection with mobile or wireless computing. Even more particularly, the invention pertains to method and apparatus of the above type wherein the general-purpose UE may be readily and automatically configured to use codecs and quality of service (QoS) definitions supported by any of the access networks selected for use, thereby optimizing application performance and resource utilization.

It is now possible to foresee a scenario wherein users will be able to employ general-purpose UEs to connect to the Internet through any one of a number of different access network types, wherein these networks are very different from one another in terms of delay, jitter, bandwidth, bit errors and the like. For example, the emerging GPRS (General Packet Radio Service) networks exhibit rather long delays and low bandwidths, whereas future generation UMTS (Universal Mobile Telecommunication System) and WLAN (Wireless Local Area Network) exhibit lower delays and much higher bandwidths.

There is currently a great effort from vendors of cellular networks such as UMTS to optimize the utilization of the wireless link, in order to significantly increase cost efficiency for the network operator. To this end, vendors standardize Quality of Service (QoS) classes to suit particular codecs and media formats selected for use over these networks. The Quality of Service classes are defined in such a way to not only give optimum media quality delivery, but also to make the most efficient use of the involved radio resources. However, this optimization effort places a limitation on the use of general-purpose wireless UEs, that is, UEs not specifically built for use with a specific network. This limitation is caused by a mismatch of codecs and reservation methods/capabilities which can occur between the general-purpose UE and a particular one of the specific access networks. The UE of relevance is here, both when the UE functionality is vertically integrated into one unit such as a cellular phone, but also when the UE is an aggregate of several units, e.g., a cellular phone connected to a laptop or PDA, or even a Personal Area Network formed by a number of end user devices (such as cell phones, digital cameras and PDA's).

Moreover, it is likely that different access networks will implement different methods for reserving resources and different service definitions or classes. Thus, UEs could require the capability to support different methods and configurations, for a number of different access networks, and to be able to distinguish between all the different network types. It could also become necessary for users to be able to manually configure UEs with the local service definitions and methods of respective different networks. For example, a user having a subscription with carrier A to access the UMTS network might find that when roaming into the UMTS network of carrier B, the service classes are quite different and therefore the user's applications perform differently.

It is virtually impossible for application developers to predict Quality of Service definitions for every access network which may be used with a general-purpose UE. Therefore, there will frequently be a mismatch between the Quality of Service desired by a user and the services offered by a particular selected network.

Finally, at present different networks have quite different service classes with locally well-defined resource reservation mechanisms, but there is no existing method of easily switching between different mechanisms and service definitions. None of the current solutions is able to optimize the data transfer using the native or standardized codecs and formats of the respective access networks, for a general-purpose UE. Such solutions either rely on the UEs being built specifically for a certain access type, or they use formats that exhibit sub-optimum resource utilization. In addition, these solutions may require the UEs to pre-install suitable codecs for all possible access networks and media types. Moreover, there is no existing method for transparently providing the coupling codecs-resource reservation mechanisms and/or classes to UEs, in order to overcome the problem of shifting or changing definitions in different access networks.

SUMMARY OF THE INVENTION

The invention presents a solution for the problems described above. More particularly, the invention enables a general-purpose UE and an access network having a particular set of specified characteristics to conform to one another. This optimizes resource utilization in the access network, while at the same time maintaining the general purpose nature of the UE. Moreover, embodiments of the invention enable a UE device to understand and conform to provider-defined services without requiring manual configuration of the UE. In the method of the invention a UE device and applications are provided with run time support that is tailored to the operational environment. If an access network has resource reservation capabilities, it is possible to provide both media and control components to the UE device. The network can provide the UE device with codecs that are suitable for the available reservation classes, and can instruct the device in regard to these classes. Thus, the UE device can be optimally configured for use with both the specific parameters of the access networks, and its particular optimized format media type.

In one embodiment, the invention is directed to a method for enhancing data transfer between a general purpose mobile UE and an access network having specific network parameters, including at least a set of specific codecs and a set of specific service definitions. The method includes the steps of operating the access network to implement a configuration node, attaching the UE to the configuration node, and then furnishing the access network with information identifying the UE and the user. The user may be associated with the UE or may identify itself in connection with the data transfer. The user may e.g. be a person or a process. The method further includes determining the specific set of UE parameters from the UE and the user identities and from the network parameters, collectively, and then configuring the attached UE to the specific set of UE parameters to avoid mismatch between the access network and the attached UE.

DETAILED DESCRIPTION OF A PREFERRED EMBODIMENT

Figure 1:
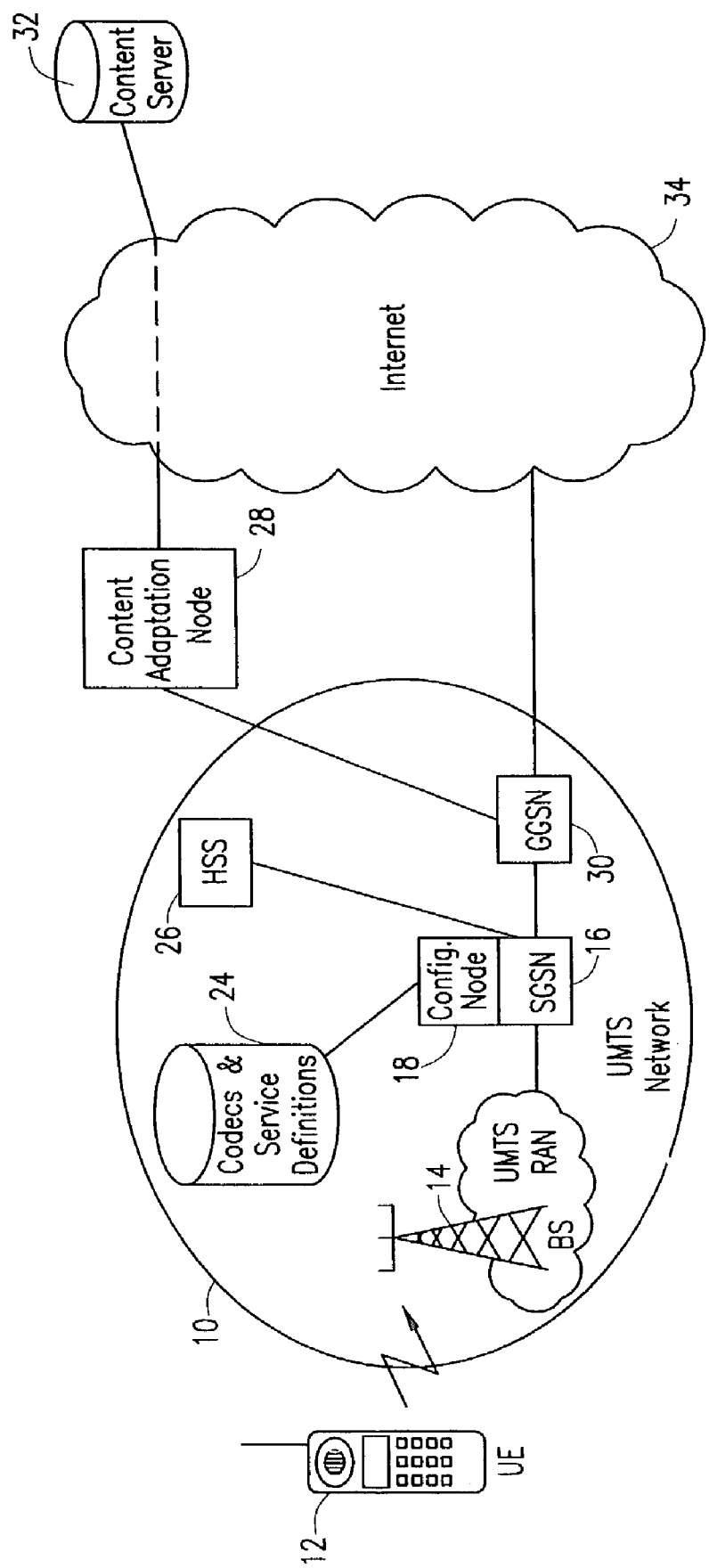
FIG. 1 is a schematic view showing an access network and a UE to be configured in accordance with an embodiment of the invention.

Referring to FIG. 1, there is shown an access network 10, such as a UMTS network that connects to the Internet 34. Access network 10 has specific native or standardized codecs and media formats. As used herein, the term "codec" (an abbreviation for "coder/decoder") refers to a function typically implemented in hardware or software that encodes or decodes a signal from one media format to another. The signal may be a digital representation of audio or video, for example, and the manner in which the digital representation is carried out is what is specified by the codec algorithm. "Media format" as used herein refers to the "codec" in which the media has been encoded, and format refers to the encoding algorithm used. Media as used herein can be audio or video, but can also be other representation types.

The network 10 also has network specific resource reservation mechanisms, i.e., methods for reserving resources, that are associated with a protocol such as RSVP (Resource Reservation Protocol) or GPRS Session Management, defined in 3GPP TS 24.008. Network 10 is further characterized by network specific bearer or transport service definitions or classes, that is, particular values for a set of QoS parameters such as bandwidth, delay, jitter and maximum number of bit errors. As is known by those of skill in the art, there is a close relationship between the specific codecs, Quality of Service classes and media formats supported in an access network.

Referring further to FIG. 1, there is shown a state of the art UE 12 disposed for connection to UMTS network 10, through a base station (BS) 14 and SGSN (Serving GPRS Support Node) 16. UE 12 may for example be a cellular phone alone, a laptop or PDA linked to a cellular phone, or some other device. The UE 12 is a general-purpose UE so that it is not specifically designed for use with the parameters characterizing network 10, that is, for the particular codecs, media formats and Quality of Service (QoS) classes thereof. Thus, in accordance with the invention UE 12 is to be configured, as described hereinafter in further detail, with the QoS definitions and corresponding codecs appropriate for use with the specific parameters of network 10, so that UE 12 will be tuned for use with the specific network 10. Data transfer between the UE 12 and network 10 may thereby be optimized in terms of e.g. quality and cost and mismatch therebetween may be avoided.

Figure 2:
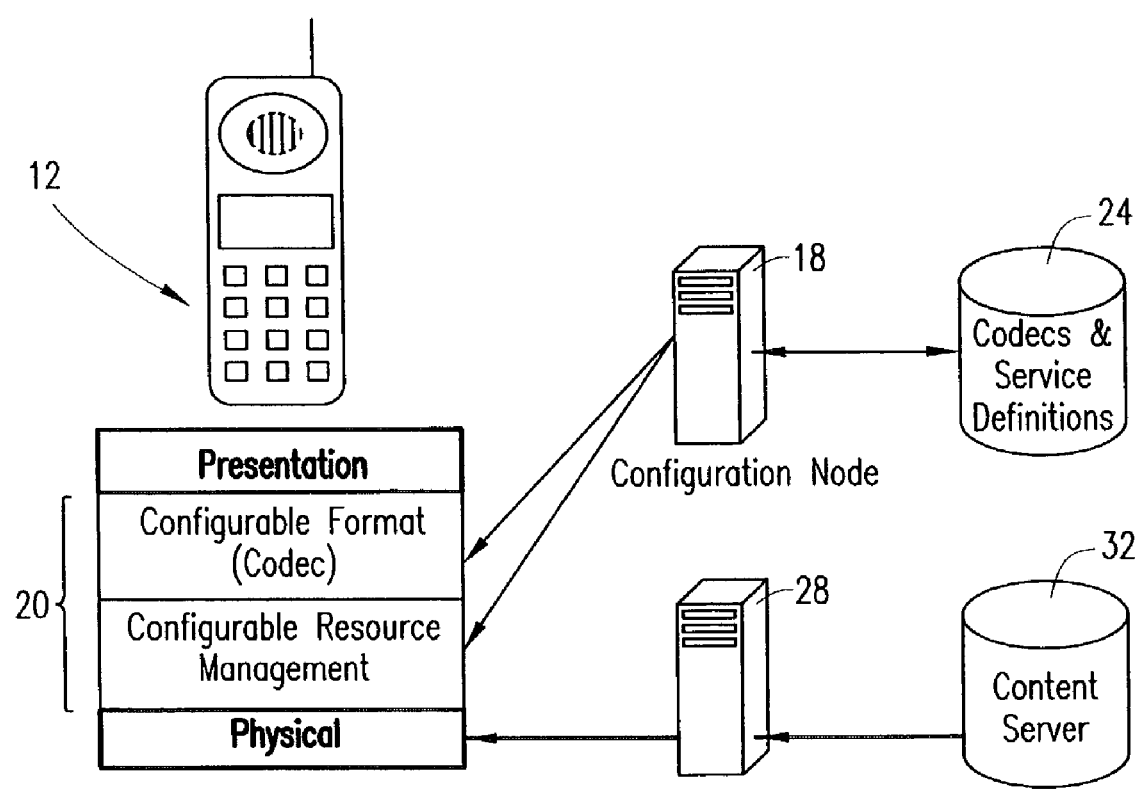
FIG. 2 is a schematic view illustrating components for an embodiment of the invention.

The configuration of UE 12 is accomplished, in part, by operating the network 10 to implement a configuration node 18, which is disposed for communication with UE 12. The configuration node may be collocated with the SGSN 16, but it can alternatively be implemented as a separate node 18, or collocated with another network node. Configuration is further implemented by providing UE 12 with a configuration layer 20, to form a configurable UE 12 as shown in FIG. 2. The layer 20 is linked to configuration node 18 of network 10, which is coupled to a repository 24 containing the codecs and service definitions available to network 10. Thus, the configurable UE 12 is enabled to understand and conform to provider-defined services, without requiring manual configuration of the UE 12. More particularly, the network 10 provides the configurable UE 12 with the Quality of service definitions (QoS definitions) available to the network 10, and further provides the device with the codecs suitable for such classes. Accordingly, the configurable UE 12, by means of configuration layer 20, can be optimally configured for both the access network specific parameters and the media format type. Similarly, the configurable UE 12 can be automatically provided with resource reservation protocols that may be specific for the access network in question. In this way, the network provider has the freedom to configure the environment and to use any resource reservation mechanism at will.

Configuration layer 20 is a logical layering of codec and Quality of Service handling functionality residing in configurable UE 12. As used herein, the terms "Quality of service definitions (QoS definitions)" is defined to mean digital values/parameters, protocols, classes, software modules, meta language definitions and algorithms. Usefully, configuration layer 20 is implemented as a software structure with a selected set of application program interfaces (API's) between the layers. Layer 20 is installed in UE 12 as an alternative to currently used preinstalled codec functionality, which generally is not adaptable to varying codec and service definition requirements. Layer 20, however, is able to carry out configuration by inserting modules at run time, in response to requests at an API. This function is analogous to plug in technologies, such as are used with web browsers, except that the configuration layer 20 operates both at the system and application levels. By providing configurable UE 12 with the access network specific parameters, as described above, configuration layer 20 may be operated to configure UE 12 to corresponding UE parameters, to avoid mismatch with such network specific parameters.

The configuration node 18 implemented by the access network communicates with the UE 12 either when the UE attaches to the network, or on demand when an application requests use of or insertion of a codec. Upon attachment, the UE 12 furnishes the SGSN 16 with information about its and the end-user's identities. Referring further to FIG. 1, there is shown SGSN 16 linked to the Home Subscriber Services register (HSS) 26, to enable HSS 26 to receive the UE and user identity from SGSN 16. The HSS 26 maintains information about the subscriptions that a user has, e.g., QoS related subscriptions.

Based on the UE and user subscription data as returned from the HSS 26, the SGSN 16 will consult the, in FIG. 1 described example embodiment, colocated Configuration Node 18 for retrieval of UE configuration information with regard to codecs and QoS classes. The configuration node makes the appropriate decisions for codecs and QoS definitions based on UE information, user subscription information and access network specific information. Access network specific information includes, for example, policies for codec use, associated service classes and specific bearer parameters. The access network specific information may be stored locally in, e.g., the configuration node, or may be retrieved from the Codecs and Service definitions repository 24. Based on the decision, the configuration node will get the actual access network dependent QoS definitions and codecs from the Codecs and Service definitions repository 24, forward those to the SGSN 16, which further will forward the information to the UE 12. The UE will at reception of the signal configure itself with the appropriate QoS definitions and the corresponding codecs using a code insertion layer 20 as described above and shown in FIG. 2.

As further shown by FIG. 1, the operator of access network 10 can also provide a media or content adaptation node 28, which is coupled to SGSN 16 through GGSN (Gateway GPRS Support Node) 30. Adaptation node 28 transforms media from its original codec format as delivered by, e.g., a content server to the native codec format supported by the access network 10 for a particular media type (e.g., MP3 to native AMR audio codec). FIG. 1 shows a content server 32 joined to adaptation node 28 via the Internet 34.

The client side implementation, at UE 12, can be realized in a number of ways. In one alternative, as referred to above, the UE can have an API for application programmers to use in order to request a codec instance or the media output from a codec in a system native format. Another alternative is for the UE 12 to provide a device interface for applications to use, such as the UNIX/dev system. In this case, the application can simply open the resource, for example /dev/acodec for audio and /dev/vcodec for video, wherein the format will be presented to the application in a standard format (e.g., PCM for audio).

Figure 3:
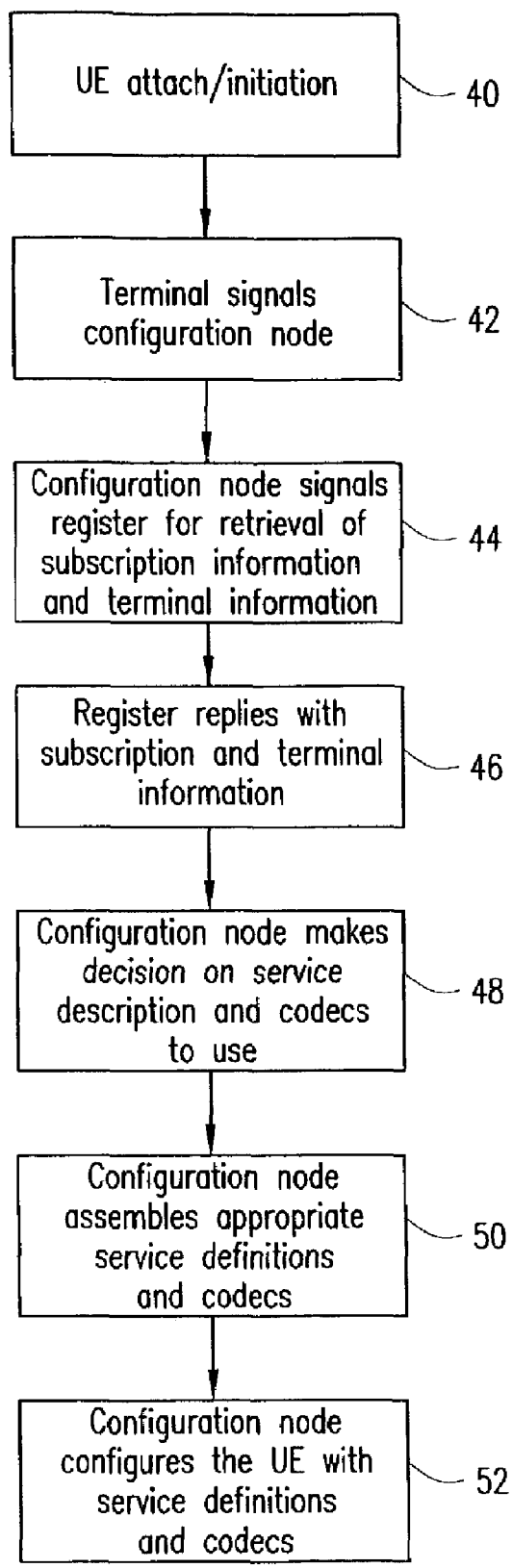
FIG. 3 is a sequencing diagram illustrating respective steps of an embodiment of the invention.

Referring to FIG. 3, Step 40 is attachment of UE to the access network. Step 40 includes sending UE and user identifier. Step 42 is when UE via access network signals the configuration node, which may also include UE and user identifier. This step may happen as part of the attachment process or at a later stage when an application in the UE desires media support requiring the need for UE external automatic configuration.

Step 44 is when the configuration node acquires necessary information details about the ULE (e.g., UE capabilities, software support/versions etc.) and also any relevant subscription information, e.g., pertaining to QoS. This can be retrieved from one or several registers in the network (e.g., subscription register) depending on the type of access network, etc.

Step 46 is when the said information is received back by the configuration node.

Step 48 is when the configuration node makes a decision of what QoS definition to use and what type of codec to use depending on access network specific information.

Step 50 is when the configuration node assembles the appropriate QoS definitions and codecs according to the decision made. These definitions and codecs may be retrieved from an appropriate repository (such as 24).

Step 52 is when the configuration node returns the QoS definitions and codecs to the UE so that the UE can make the necessary configuration of itself in the configuration layer.

Embodiments of the invention allow general-purpose UEs to always use codecs and QoS definitions that are natively supported by an access network. Since the access networks and these codecs are harmonized, the utilization of radio resources can be optimized. Embodiments of the invention also enable the optimization to take place transparently to the application, whereby use of the system becomes extremely flexible and manageable. Further benefits include simplified usage of temporary network accesses such as pre-paid access to a temporarily visited network, since the UE can operate without upgrading or installing software. Moreover, other embodiments of the invention can be directed to incorporate other protocol functions such as mobility management protocols. That is, the specific protocol used within an access network can be automatically installed on a UE, thus avoiding manual configuration and software updates.

In a further embodiment of the invention representing a more general case, UE 12 can have distributed functionality such as in a Personal Area Network (PAN). An example of a PAN is the combined functionality of a lap top or PDA and a cellular phone, where the cellular phone can provide wide area connectivity for the lap top or PDA. In this example, "device auto configuration functionality" could be split between the two parts of the PAN, such as QoS functionality would go into the cell phone and (corresponding) video codec functionality would go into the laptop/PDA. More complex PANs can be envisaged involving more than two devices. In essence the configuration layer may be distributed over several devices.

In still a further embodiment, the access network may rely on other access type technologies than GPRS/UMTS, for instance WLAN, GSM etc. In such an arrangement a configuration node may couple to an access router in said access network or another access network specific node dependent on access type.

Obviously, many other modifications and variations of the present invention are possible in light of the above teachings. It is therefore to be understood that within the scope of the disclosed concept, the invention may be practiced otherwise than as has been specifically described.

What is claimed:

1. A method for enhancing data transfer between a user equipment (UE) and an access network having specific access network parameters, said access network parameters comprising at least a set of specific codecs and a set of specific service definitions for said access network, said method comprising the steps of:

operating said access network to implement a configuration node disposed for selective communication with said UE;

furnishing said access network with information identifying said UE or a user associated with said UE and with other information associated with said UE or said user, retrieved directly or indirectly from the UE home network; and determining a specific set of parameters applicable to said UE from:
said specific access network parameters,
said UE identity or said user identity information,
and said other information.

2. The method of claim 1 wherein:

said method includes the step of furnishing said UE with said specific set of UE parameters.

3. The method of claim 2 wherein:

said UE furnishing step comprises operating said configuration node of said access network to supply said specific set of UE parameters to said UE.

4. The method of claim 3 wherein:

said UE furnishing step enables said UE to configure a configuration layer in accordance with said specific set of UE parameters.

5. The method of claim 4 wherein:

said configuration layer is capable of inserting modules and a set of digital values/parameters as part of said specific set of UE parameters.

6. The method of claim 5 wherein:

said UE has distributed functionality over a plurality of physical devices.

7. The method of claim 6 wherein:
the configuration layer is distributed over said plurality of physical devices.

8. The method of claim 5 wherein:
said modules and said set of digital values/parameters are appropriately distributed across said plurality of physical devices for their respective configuration.

9. The method of claim 3 wherein:
communication takes place between said access network and said UE after said UE is attached to said access network.

10. The method of claim 3 wherein:
communication takes place between said UE and said access network when an application requests functional support requiring configuration of said specific set of UE parameters into said attached UE.

11. The method of claim 3 wherein:
said access network comprises a UMTS network and said configuration node is collocated with the SGSN node of said access network.

12. The method of claim 3 wherein:
said access network comprises a GPRS network or a CDMA network or a CDMA2000 network or a WLAN.

13. The method of claim 1 wherein:
said UE identifying information is signaled from said configuration node to a subscription register in said access network, and in response said subscription register provides said configuration node with UE information and with user subscription information associated with said UE for use in determining said specific set of UE parameters.

14. The method of claim 1 wherein:
said specific set of UE parameters include specific codecs and QoS definitions for said UE which are stored in said access network, and are accessible to said configuration node for use in configuring said UE.

15. A method for enhancing data transfer between a general purpose user equipment and a wireless access network having specific access network parameters, said access network parameters comprising at least a set of specific codecs and a set of specific QoS definitions for said access network, said method comprising the step of:
configuring said UE with a specific set of parameters applicable to the UE that are derived from said specific access network parameters and from UE identity information and with user subscription information associated with said UE for use in determining said specific set of QoS definitions retrieved directly or indirectly from the UE home network.

16. The method of claim 15 wherein:
said specific set of UE parameters are further derived from a user identity that is associated with said UE or with said data transfer.

17. The method of claim 15, wherein said method further comprises the steps of:
operating said access network to implement a configuration node disposed for selective communication with said UE; and
operating said configuration node to supply said specific set of UE QoS definitions to a configuration layer residing in said UE.

18. In a system including an access network having specific network parameters, said network parameters comprising at least a set of specific codecs and a set of specific QoS definitions for said access network, an apparatus for enhancing data transfer between a general purpose UE and said access network comprising:
a subscription register in said access network storing information pertaining to a specific set of access network parameters; and
a configuration node implemented in said access network:
for communicating with said UE to receive the identity of said UE or a user,
for retrieving directly or indirectly from the UE home network, information identifying said UE or a user associated with said UE and other information associated with said UE or said user;
for providing said identities and said other information to said subscription register, and
for selectively communicating to said UE a specific set of network parameters applicable to said UE in response to providing said identities.

19. The apparatus of claim 18 wherein:
said configuration node determines said specific set of parameters applicable to said UE from said information stored in said subscription register.

20. The apparatus of claim 18, wherein said apparatus further comprises:
modules corresponding to said specific set of parameters applicable to said UE and disposed for transmission to said UE for enabling said UE to insert said modules into a configuration layer.

21. The apparatus of claim 20 wherein:
communication takes place between said access network and said UE in conjunction with the attachment of said access network.

22. The apparatus of claim 20 wherein:
communication takes place between said UE and said access network when an application requests functional support requiring insertion of one of said modules and/or set of digital values/parameters into said attached UE.

23. The apparatus of claim 18 wherein:
said configuration node of said access network is operated to supply said specific set of parameters applicable to said UE to a configuration layer residing in said UE.

24. The apparatus of claim 18 wherein:
said configuration node is disposed to signal said UE identity and/or said user identity to said subscription register, and in response said subscription register provides said configuration node with UE information and with user subscription information for use in determining said specific set of parameters applicable to said UE.

25. The apparatus of claim 18 wherein:
said specific set of parameters applicable to said UE include specific codecs and QoS definitions for said UE which are stored in said access network, and are accessible to said configuration node for use in configuring said UE.

26. The apparatus of claim 18 wherein:
said access network comprises a GPRS network or a CDMA network or a CDMA2000 network or a WLAN.

27. The apparatus of claim 18 wherein:
said access network comprises a UMTS network and said configuration node is collocated with the SGSN node of said access network.

* * * * *

UNITED STATES PATENT AND TRADEMARK OFFICE
CERTIFICATE OF CORRECTION

| | | |
|---|---|---|
| PATENT NO. | : 7,158,788 B2 | Page 1 of 1 |
| APPLICATION NO. | : 10/273821 | |
| DATED | : January 2, 2007 | |
| INVENTOR(S) | : Holler et al. | |

It is certified that error appears in the above-identified patent and that said Letters Patent is hereby corrected as shown below:

In Column 5, Line 36, delete "ULE" and insert -- UE --, therefor.

Signed and Sealed this

Eighteenth Day of December, 2007

JON W. DUDAS
*Director of the United States Patent and Trademark Office*